US012566951B2

(12) United States Patent
Kim et al.

(10) Patent No.: US 12,566,951 B2
(45) Date of Patent: Mar. 3, 2026

(54) METHOD AND APPARATUS FOR PERFORMING DEEP LEARNING OPERATIONS

(71) Applicant: SAMSUNG ELECTRONICS CO., LTD., Suwon-si (KR)

(72) Inventors: Dongyoung Kim, Suwon-si (KR); Sehwan Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1190 days.

(21) Appl. No.: 17/307,072

(22) Filed: May 4, 2021

(65) Prior Publication Data

US 2022/0180187 A1 Jun. 9, 2022

(30) Foreign Application Priority Data

Dec. 4, 2020 (KR) ........................ 10-2020-0167970

(51) Int. Cl.
| | |
|---|---|
| *G06N 3/08* | (2023.01) |
| *G06F 9/30* | (2018.01) |
| *G06F 17/16* | (2006.01) |

(52) U.S. Cl.
CPC ........... *G06N 3/08* (2013.01); *G06F 9/30036* (2013.01); *G06F 17/16* (2013.01)

(58) Field of Classification Search
CPC ...... G06F 9/30036; G06F 17/16; G06F 7/523; G06F 7/5443; G06F 15/7889; G06N 3/045; G06N 3/063
USPC ....................................................... 708/200
See application file for complete search history.

(56) References Cited

U.S. PATENT DOCUMENTS

| | | | |
|---|---|---|---|
| 2016/0342889 A1 | 11/2016 | Thorson et al. | |
| 2018/0129936 A1* | 5/2018 | Young ................... | G06N 3/063 |
| 2019/0042251 A1 | 2/2019 | Nurvitadhi et al. | |
| 2019/0138567 A1 | 5/2019 | Martin et al. | |
| 2019/0392287 A1 | 12/2019 | Ovsiannikov et al. | |
| 2020/0028444 A1* | 1/2020 | Tochikawa ........... | H02M 7/003 |
| 2020/0134417 A1* | 4/2020 | Mohapatra ........... | G06N 3/063 |
| 2020/0293867 A1 | 9/2020 | Shao et al. | |
| 2021/0397933 A1* | 12/2021 | Boesch ................. | G06N 3/045 |

FOREIGN PATENT DOCUMENTS

| | | |
|---|---|---|
| CN | 210924662 U | 7/2020 |
| KR | 10-2019-0084088 A | 7/2019 |
| KR | 10-2034659 B1 | 10/2019 |

(Continued)

OTHER PUBLICATIONS

Chen, Chixiao, et al., "iFPNA: A Flexible and Efficient Deep Learning Processor in 28-nm CMOS Using a Domain-Specific Instruction Set and Reconfigurable Fabric", *IEEE Journal on Emerging and Selected Topics in Circuits and Systems* 9.2 (2019): 346-357.

(Continued)

*Primary Examiner* — Michael D. Yaary
(74) *Attorney, Agent, or Firm* — NSIP Law

(57) ABSTRACT

A method and apparatus for performing deep learning operations. A computation apparatus includes an adder tree-based tensor core configured to perform a tensor operation, and a multiplier and accumulator (MAC)-based vector core configured to perform a vector operation using an output of the tensor core as an input.

22 Claims, 12 Drawing Sheets

(56)  References Cited

FOREIGN PATENT DOCUMENTS

| KR | 10-2020-0070089 | A | 6/2020 |
| KR | 10-2020-0128360 | A | 11/2020 |

OTHER PUBLICATIONS

Extended European search report issued on Feb. 8, 2022, in counterpart European Patent Application No. 21185561.4 (7 pages in English).

Zhu, Maohua, et al., "Sparse Tensor Core: Algorithm and Hardware Co-Design for Vector-wise Sparse Neural Networks on Modern GPUs", Proceedings of the 52nd Annual IEEE/ACM International Symposium on Microarchitecture, 2019 (13 pages in English).

Korean Office Action issued on Jan. 23, 2025, in corresponding Korean Patent Application No. 10-2020-0167970. (2pages in English, 6 pages in Korean).

* cited by examiner

METHOD AND APPARATUS FOR PERFORMING DEEP LEARNING OPERATIONS

CROSS-REFERENCE TO RELATED APPLICATIONS

This application claims the benefit under 35 USC § 119(a) of Korean Patent Application No. 10-2020-0167970 filed on Dec. 4, 2020, in the Korean Intellectual Property Office, the entire disclosure of which is incorporated herein by reference for all purposes.

BACKGROUND

1. Field

The following description relates to a method and apparatus for performing deep learning operations, and more particularly, to a computation apparatus configured with a multiplier and accumulator (MAC)-based co-processor in an adder tree-based artificial neural network accelerator.

2. Description of Related Art

An artificial neural network (ANN) is implemented based on a computational architecture. Due to the development of ANN technologies, research is being actively conducted to analyze input data using ANNs in various types of electronic systems and extract valid information.

A device to process an ANN requires a large amount of computation for complex input data. Most artificial intelligence (AI) applications provide sophisticated but slow-responsive services through a network connection between a server and a client. This is because an ANN, a key algorithm of deep learning, typically requires 1000 times or more computing operations than general application processors (APs).

Thus, there is a desire for an architecture to energy-efficiently realize such a high computational requirement.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an apparatus for performing a deep learning operation includes a tensor core configured to perform a tensor operation, the tensor core being based on an adder tree, and a vector core configured to perform a vector operation using an output of the tensor core as an input, the vector core being based on a multiplier and accumulator (MAC).

The tensor operation may include a matrix-matrix multiplication operation, and the vector operation may include any one or any combination of a vector-matrix multiplication operation, a vector-vector multiplication operation, and an element-wise operation.

The vector core may include a MAC-based arithmetic logic unit (ALU) configured to perform the vector operation.

The vector core may include a functional unit configured to perform one or both of a pooling operation and a non-linear function operation.

The functional unit may include a look-up table to perform one or both of the pooling operation and the non-linear function operation.

The vector core may include a weight buffer configured to store weight data.

The apparatus may further include a local buffer configured to store data to enable the vector core to reuse the output of the tensor core to perform the vector operation.

The vector core may be configured to perform a first vector operation using an output of a first tensor operation as an input while the tensor core is performing a second tensor operation.

The vector core may include a functional unit configured to perform one or both of a pooling operation and a non-linear function operation, a MAC-based ALU that is configured to perform the vector operation, a weight buffer configured to store weight data, and a first multiplexer configured to select at least one of the output of the tensor core and an output of the ALU as an input of the functional unit.

The vector core may further include a second multiplexer configured to select at least one of an output of the functional unit and an output of the first multiplexer as an input of the ALU.

The vector core may further include a third multiplexer configured to select at least one of an output of the functional unit and the output of the ALU as an output of the vector core.

The tensor core may be configured to perform a traversal for the tensor operation in units of blocks for performing the vector operation.

The tensor core may be configured to perform a convolution operation. The vector core may include a functional unit configured to perform at least one of a pooling operation and a non-linear function operation, a MAC-based ALU that is configured to perform the vector operation, and a weight buffer configured to store weight data. The functional unit may be configured to receive an output of the convolution operation as an input and to perform a first activation function operation, the ALU may be configured to perform a depth-wise convolution operation between the weight data and a result of the first activation function operation, and the functional unit may be configured to receive a result of the depth-wise convolution operation as an input and to perform a second activation function operation.

In another general aspect, a method of performing a deep learning operation includes performing a tensor operation using a tensor core that is based on an adder tree, and performing a vector operation using an output of the tensor core as an input, by a vector core that is based on a MAC.

The tensor operation may include a matrix-matrix multiplication operation, and the vector operation may include any one or any combination of a vector-matrix multiplication operation, a vector-vector multiplication operation, and an element-wise operation.

The performing of the tensor operation may include performing a convolution operation. The performing of the vector operation may include receiving an output of the convolution operation as an input and performing a first activation function operation, performing a depth-wise convolution operation between weight data and a result of the first activation function operation, and receiving a result of the depth-wise convolution operation as an input and performing a second activation function operation.

The performing of the tensor operation may include performing a traversal for the tensor operation in units of blocks for performing the vector operation.

In another general aspect, an apparatus includes one or more processors configured to perform a first tensor operation and perform a second tensor operation subsequent to the first tensor operation, and perform a vector operation using an output of the first tensor operation as an input while simultaneously performing the second tensor operation.

The one or more processors may include an adder tree-based artificial neural network (ANN) accelerator configured to perform the first tensor operation and the second tensor operation; and a multiplier and accumulator (MAC)-based processor configured to perform the vector operation.

The first tensor operation may be a first convolution operation, the second tensor operation may be a second convolution operation, and the vector operation may be a depth-wise convolution operation.

The one or more processors may be configured to perform an activation function operation on a result of the first convolution operation to generate the output of the first tensor operation.

Other features and aspects will be apparent from the following detailed description, the drawings, and the claims.

Figure 1A:
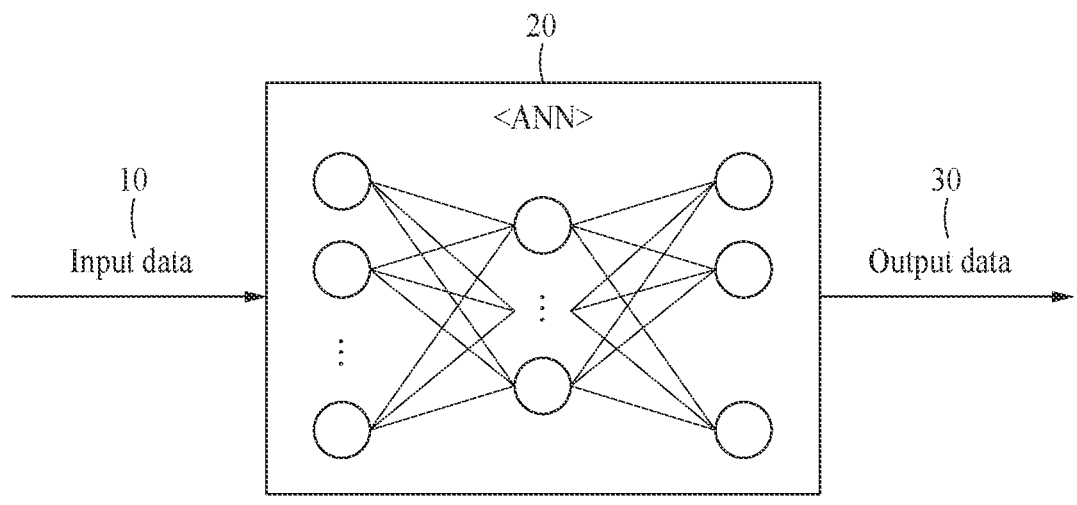
FIG. 1A illustrates an example of a method of performing deep learning operations using an artificial neural network (ANN).

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art, after an understanding of the disclosure of this application, may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions of examples disclosed in the present disclosure are merely intended for the purpose of describing the examples and the examples may be implemented in various forms. The examples are not meant to be limited, but it is intended that various modifications, equivalents, and alternatives are also covered within the scope of the claims.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms used herein including technical or scientific terms have the same meanings as those generally understood consistent with and after an understanding of the present disclosure. Terms, such as those defined in commonly used dictionaries, should be construed to have meanings matching with contextual meanings in the relevant art and the present disclosure, and are not to be construed as an ideal or excessively formal meaning unless otherwise defined herein.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

FIG. 1A illustrates an example of a method of performing deep learning operations using an artificial neural network (ANN).

An artificial intelligence (AI) algorithm including deep learning may input data 10 to an ANN, and may learn output data 30 through an operation, for example, a convolution. The ANN may be a computational architecture obtained by modeling a biological brain. In the ANN, nodes corresponding to neurons of a brain may be connected to each other and may collectively operate to process input data. Various types of neural networks may include, for example, a convolutional neural network (CNN), a recurrent neural network (RNN), a deep belief network (DBN), or a restricted Boltzmann machine (RBM), but is not limited thereto. In a feed-forward neural network, neurons may have links to other neurons. The links may be expanded in a single direction, for example, a forward direction, through a neural network.

FIG. 1A illustrates a structure in which the input data 10 is input to the ANN and in which output data 30 is output through the ANN. The ANN may include at least one layer and may be, for example, a CNN 20. The ANN may be, for example, a deep neural network (DNN) including at least two layers.

The CNN 20 may be used to extract "features", for example, a border or a line color, from the input data 10. The CNN 20 may include a plurality of layers. Each of the layers may receive data, may process data input to a corresponding layer and may generate data that is to be output from the corresponding layer. Data output from a layer may be a feature map generated by performing a convolution operation of an image or a feature map that is input to the CNN 20 and a weight value of at least one filter. Initial layers of the CNN 20 may operate to extract features of a relatively low level, for example, edges or gradients, from an input, such as image data. Subsequent layers of the CNN 20 may gradually extract more complex features, for example, an eye or a nose in an image.

Figure 1B:
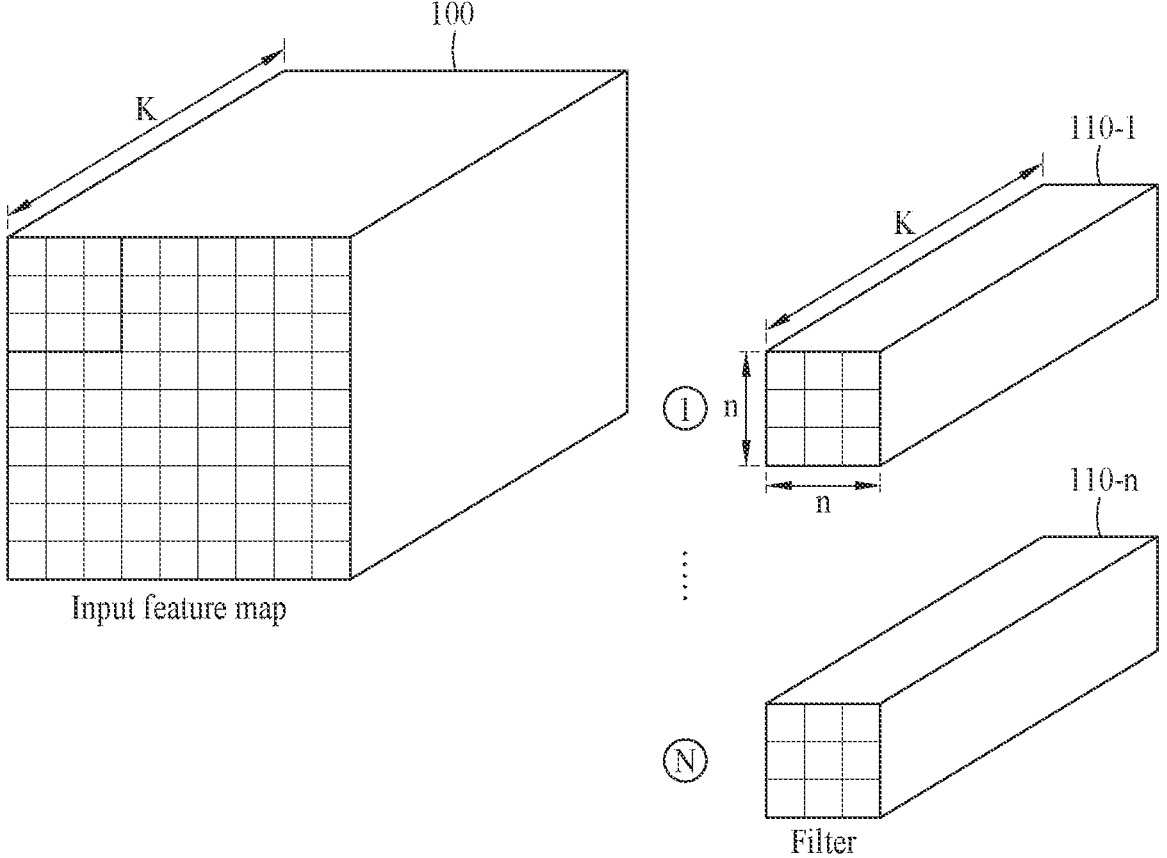
FIG. 1B illustrates an example of filters and data of an input feature map provided as an input in a deep learning operation.

FIG. 1B illustrates an example of filters and data of an input feature map provided as an input in a deep learning operation.

Referring to FIG. 1B, an input feature map 100 may be a set of numerical data or pixel values of an image input to an ANN, but is not limited thereto. In FIG. 1B, the input feature map 100 may be defined by pixel values of a target image that is to be trained using the ANN. For example, the input feature map 100 may have "256×256" pixels and a depth with a value of "K". However, the above values are merely examples, and a size of the pixels of the input feature map 100 is not limited thereto.

"N" filters, for example, filters 110-1 to 110-n may be formed. Each of the filters 110-1 to 110-n may include "n×n" weight values. For example, each of the filters 110-1 to 110-n may be "3×3" pixels and a depth value of 'K'. However, the above size of each of the filters 110-1 to 110-n is merely an example and is not limited thereto.

Figure 1C:
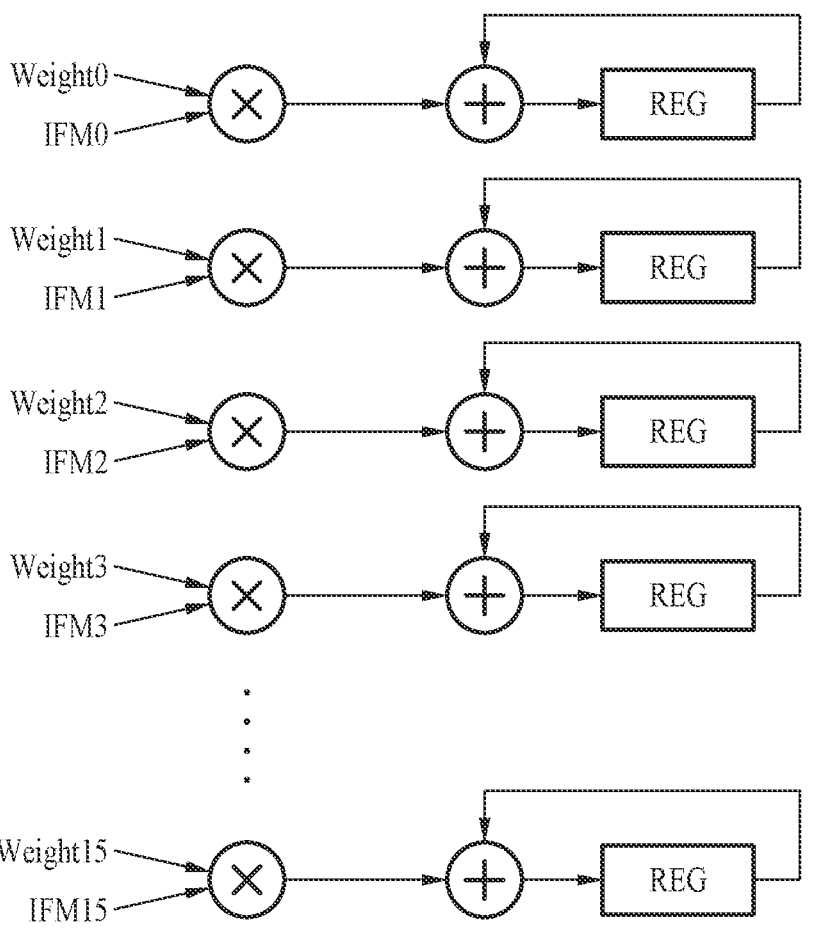
FIG. 1C illustrates a method of performing deep learning operations using an adder tree according to a related art.
Figure 1D:
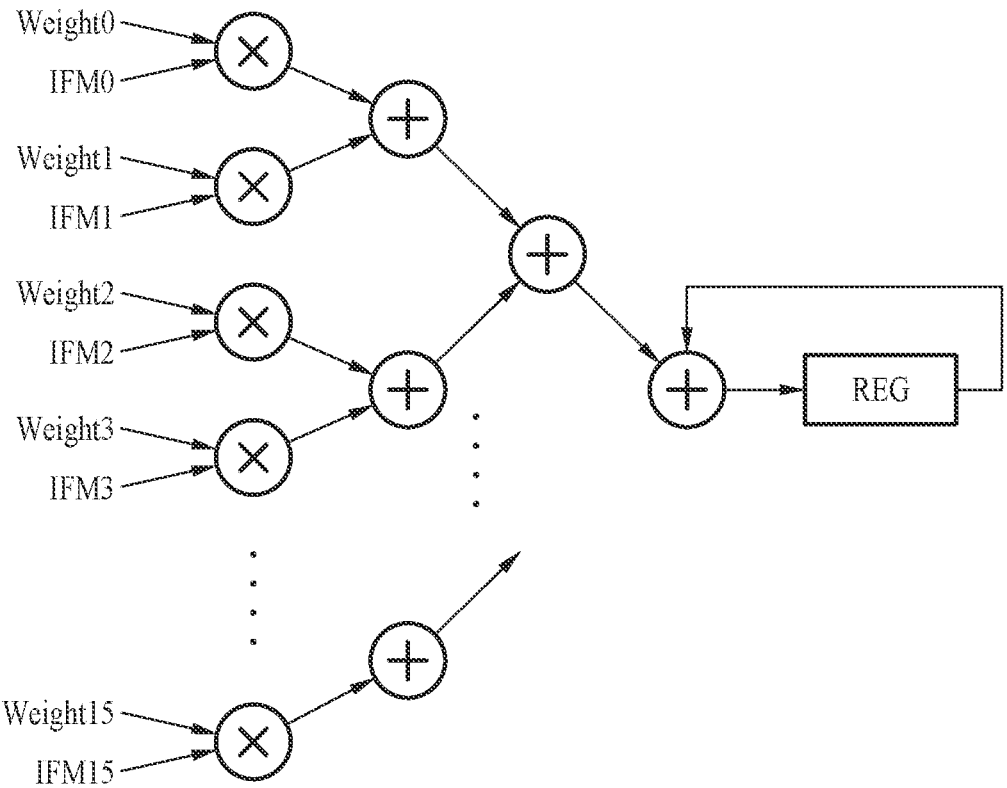
FIG. 1D illustrates a method of performing deep learning operations using a plurality of multipliers and accumulators (MACs) according to the related art.

FIG. 1C illustrates a method of performing deep learning operations using an adder tree according to a related art, and FIG. 1D illustrates a method of performing deep learning operations using a plurality of multipliers and accumulators (MACs) according to the related art.

Referring to FIG. 1C, an adder tree-based computation device may include a plurality of multipliers that calculate a product of two pieces of data, an adder that calculates a sum of outputs of two neighboring multipliers or a sum of two neighboring adders, and a single accumulator that accumulates and sums final output data. Since a small number of accumulators, for example, a single accumulator, is used, the adder tree-based computation device may perform a convolution operation with low power.

Referring to FIG. 1D, a MAC-based computation device may include a plurality of processing elements (PEs), and may simultaneously perform a relatively large number of operations by inputting input data to each of the PEs. Each of the PEs in the MAC-based computation device may be configured with a MAC that performs an operation of $ACC=ACC+(A\times B)$.

In deep learning operations, operations with different features, for example, a computation-bound operation with a high proportion of a computation time out of a total execution time for performing the deep learning operations, and a memory-bound operation with a high proportion of a memory access time out of the total execution time are mixed. For example, a tensor operation, for example, a matrix-matrix multiplication operation, may have a computation-bound characteristic with a high proportion of a computation time out of the total execution time, and a vector operation, for example, a vector-matrix multiplication operation, a vector-vector multiplication operation, or an element-wise operation, may have a memory-bound characteristic with a high proportion of a memory access time out of the total execution time.

To support a high accuracy and more complex and diverse applications, requirements for a vector operation, for example, an interpolation operation, various types of non-linear function estimation operations, or a depth-wise convolution operation, in an ANN are increasing.

However, a computation device with an adder tree structure according to the related art is inefficient due to a low utilization when a memory-bound operation is performed. For example, a depth-wise convolution operation may be performed for each input feature map of each input channel. However, if the depth-wise convolution operation is performed using the computation device with the adder tree structure, resource utilization may be reduced because there are multipliers that are not used. Also, since a memory microfabrication speed is lower than a logic microfabrication speed, a logic density may be relatively enhanced. Thus, a lack of a memory bandwidth in the adder tree-based computation device may be expected to intensify in the future.

The MAC-based computation device may include accumulators for each MAC unit, and accordingly the MAC-based computation device may be suitable for performing a vector operation. For example, the MAC-based computation device may be suitable for performing a depth-wise convolution operation for each channel. However, since the MAC-based computation device requires accumulators for all MAC units, a relatively large amount of power may be consumed. For example, when the adder tree-based computation device performs a general convolution operation, only a single accumulator is required. However, when the MAC-based computation device performs a general convolution operation, all the accumulators may operate, which may lead to a reduction in a power efficiency. Thus, the MAC-based computation device may be suitable for a vector operation (for example, a parallel processing operation of data such as a depth-wise convolution operation), but may be unsuitable for a tensor operation (for example, a general convolution operation).

In an example based on the present disclosure, an apparatus (hereinafter, referred to as a "computation apparatus") for performing deep learning operations may include both an adder tree-based ANN accelerator and a MAC-based co-processor, may perform a tensor operation using the adder tree-based ANN accelerator, and may efficiently perform a vector operation using the MAC-based co-processor. Hereinafter, examples of an operating method of the computation apparatus will be described in detail with reference to FIGS. 2 to 7B.

Figure 2:
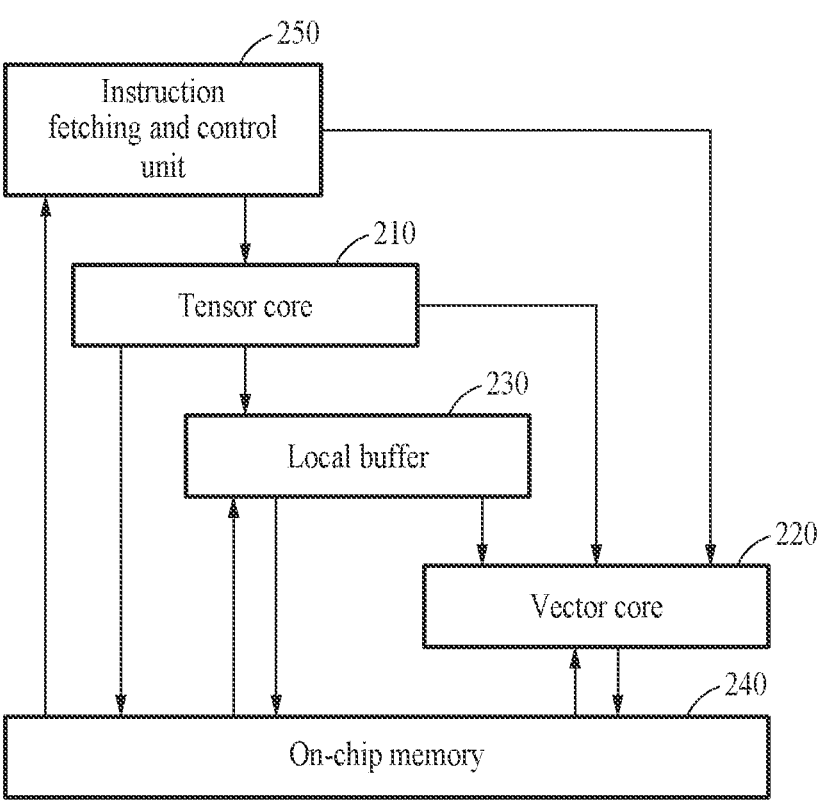
FIG. 2 illustrates an example of a hardware implementation of a computation apparatus.

FIG. 2 illustrates an example of a hardware implementation of a computation apparatus based on the present disclosure.

Referring to FIG. 2, the computation apparatus may include a tensor core 210 and a vector core 220. The computation apparatus may further include a local buffer 230, an on-chip memory 240, and an instruction fetching and control unit 250, hereinafter, referred to as a "controller 250". Although the respective components of the computation apparatus are separately illustrated in FIG. 2 to indicate that the components are functionally and logically separable, this does not necessarily imply that the components are realized as physically separate components or codes.

The tensor core 210 may be an adder tree-based ANN accelerator that performs a tensor operation, and the vector core 220 may be a MAC-based co-processor that performs a vector operation.

For a vector operation that uses an output of a tensor operation as an input, the computation apparatus may perform the vector operation using the output of the tensor operation as an input of the vector operation without a write-back of the output of the tensor operation to the on-chip memory 240, instead of performing the vector operation after writing back the output of the tensor operation to the on-chip memory 240. Thus, the computation apparatus may reduce a memory bandwidth requirement of the vector operation and may enhance computation resource utilization.

The computation apparatus may include the local buffer 230 to reuse data. Reusing data may indicate performing an operation by repeatedly using pre-loaded data (for example, a weight or an input feature map). By reusing data, a number of times data is loaded and a number of times an operation is performed may be reduced.

Figure 3:
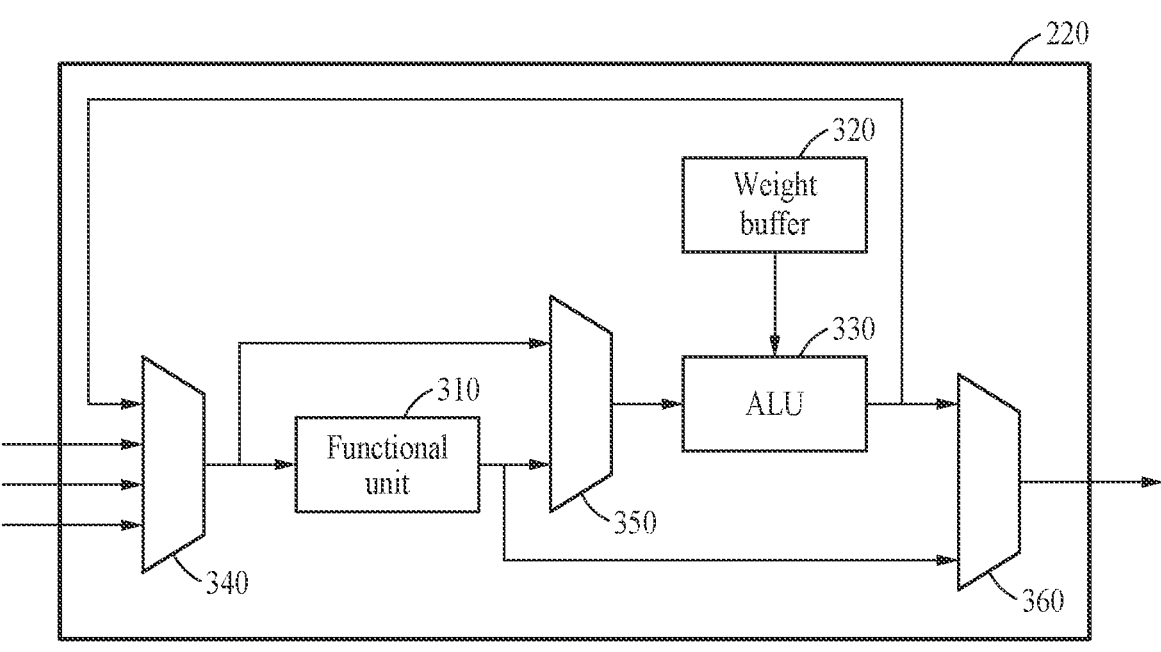
FIG. 3 illustrates an example of a hardware implementation of a vector core.

FIG. 3 illustrates an example of a hardware implementation of a vector core based on the present disclosure.

Referring to FIG. 3, the vector core 220 may include a functional unit 310, a weight buffer 320, and an arithmetic logic unit (ALU) 330. Although the respective components of the vector core 220 are separately illustrated in FIG. 3 to indicate that the components are functionally and logically separable, this does not necessarily imply that the components are realized as physically separate components or codes.

The functional unit 310 may perform one or both of a pooling operation and a non-linear function operation. The functional unit 310 may include a look-up table to perform one or both of the pooling operation and the non-linear function operation.

The weight buffer 320 may store weight data.

The ALU 330 may be a MAC-based arithmetic logic device that performs a vector operation.

Also, the vector core 220 may further include a first multiplexer 340 configured to select at least one of an output of the tensor core 210 and an output of the ALU 330 as an input of the functional unit 310, a second multiplexer 350 configured to select at least one of an output of the functional unit 310 and an output of the first multiplexer 340 as an input of the ALU 330, and a third multiplexer 360 configured to select at least one of the output of the functional unit 310 and the output of the ALU 330 as an output of the vector core 220. Hereinafter, examples of the operating method of the computation apparatus including the tensor core 210 and the vector core 220 will be further described with reference to FIGS. 4 to 7B.

Figure 4:
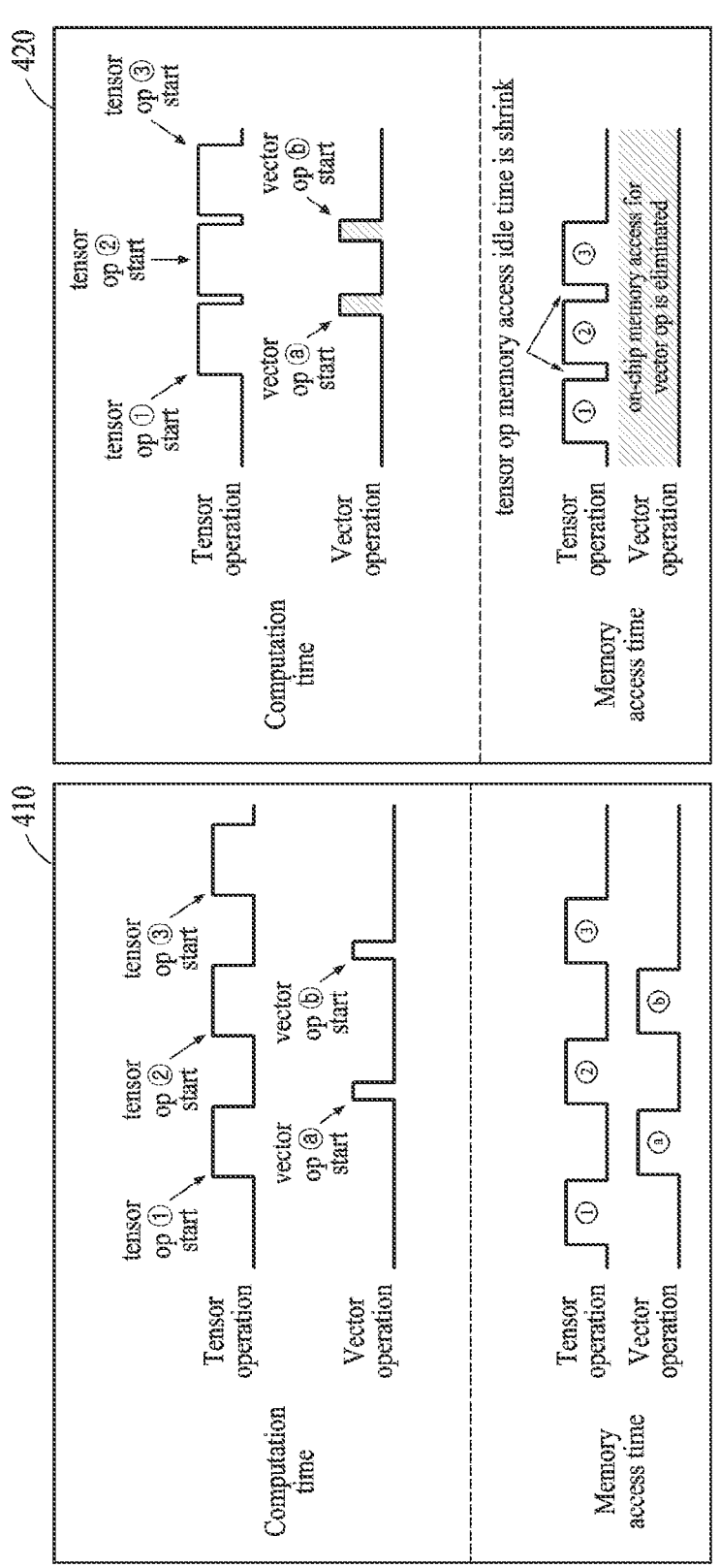
FIG. 4 illustrates an example of an operating method of a computation apparatus.

FIG. 4 illustrates an example of an operating method of a computation apparatus based on the present disclosure.

Referring to FIG. 4, a left box 410 illustrates a computation time and a memory access time required when only a tensor core is used to perform tensor operations and vector operations, and a right box 420 illustrates a computation time and a memory access time required when the computation apparatus including a tensor core and a vector core according to an example is used to perform tensor operations and vector operations.

In FIG. 4, it is assumed that an operation includes, for example, a first tensor operation, a second tensor operation, a third tensor operation, a first vector operation, and a second vector operation, that an output of the first tensor operation is an input of the first vector operation and that an output of the second tensor operation is an input of the second vector operation.

In the computation apparatus, the vector core 220 together with the tensor core 210 may perform operations in parallel, and thus it is possible to reduce a total computation time by hiding a computation time of a vector operation.

In an example, referring to the left box 410, a computation device using only the tensor core may perform a vector operation only after a tensor operation ends, and may perform a next tensor operation only after the vector operation ends. For example, the computation device using the tensor core may inevitably perform the second tensor operation only after the first vector operation ends.

In another example, referring to the right box 420, since the computation apparatus independently includes the tensor core 210 configured to perform a tensor operation, and the vector core 220 configured to perform a vector operation, the vector core 220 together with the tensor core 210 may perform operations in parallel (for example, simultaneously). For example, the tensor core 210 may perform the second tensor operation while the vector core 220 is performing the first vector operation. Also, the tensor core 210 may perform the third tensor operation while the vector core 220 is performing the second vector operation.

The computation apparatus may perform a vector operation using the vector core 220 optimized to perform the vector operation, and thus it is possible to enhance hardware utilization compared to when only the tensor core is used to perform an operation.

Also, the computation apparatus may perform a vector operation using an output of a tensor operation as an input of the vector operation, instead of performing the vector operation after writing back the output of the tensor operation to the on-chip memory 240. As a result, the computation apparatus may reduce on-chip memory access energy. Also, the computation apparatus may reduce a memory access idle time of the tensor operation, which may result in a decrease in a total time for performing operations.

Referring to the left box 410, it is inevitable that the computation device using only the tensor core may write back an output of a tensor operation to the on-chip memory 240 and then perform a vector operation. For example, the computation device using only the tensor core may write back an output of the first tensor operation to the on-chip memory 240 and then perform the first vector operation.

Referring to the right box 420, the computation apparatus may perform a vector operation using an output of a tensor operation as an input of the vector operation, instead of writing back the output of the tensor operation to the on-chip memory 240. For example, the computation apparatus may use the output of the first tensor operation as the input of the first vector operation and may use the output of the second tensor operation as the input of the second vector operation.

Figure 5A:
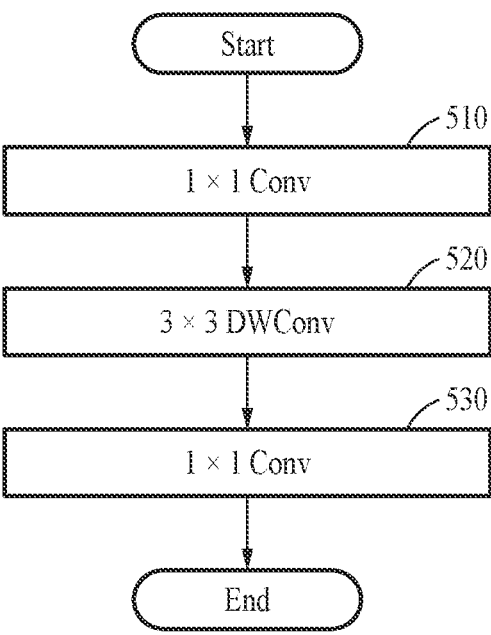
FIGS. 5A and 5B illustrate examples of processing a depth-wise convolution block using a computation apparatus.
Figure 5B:
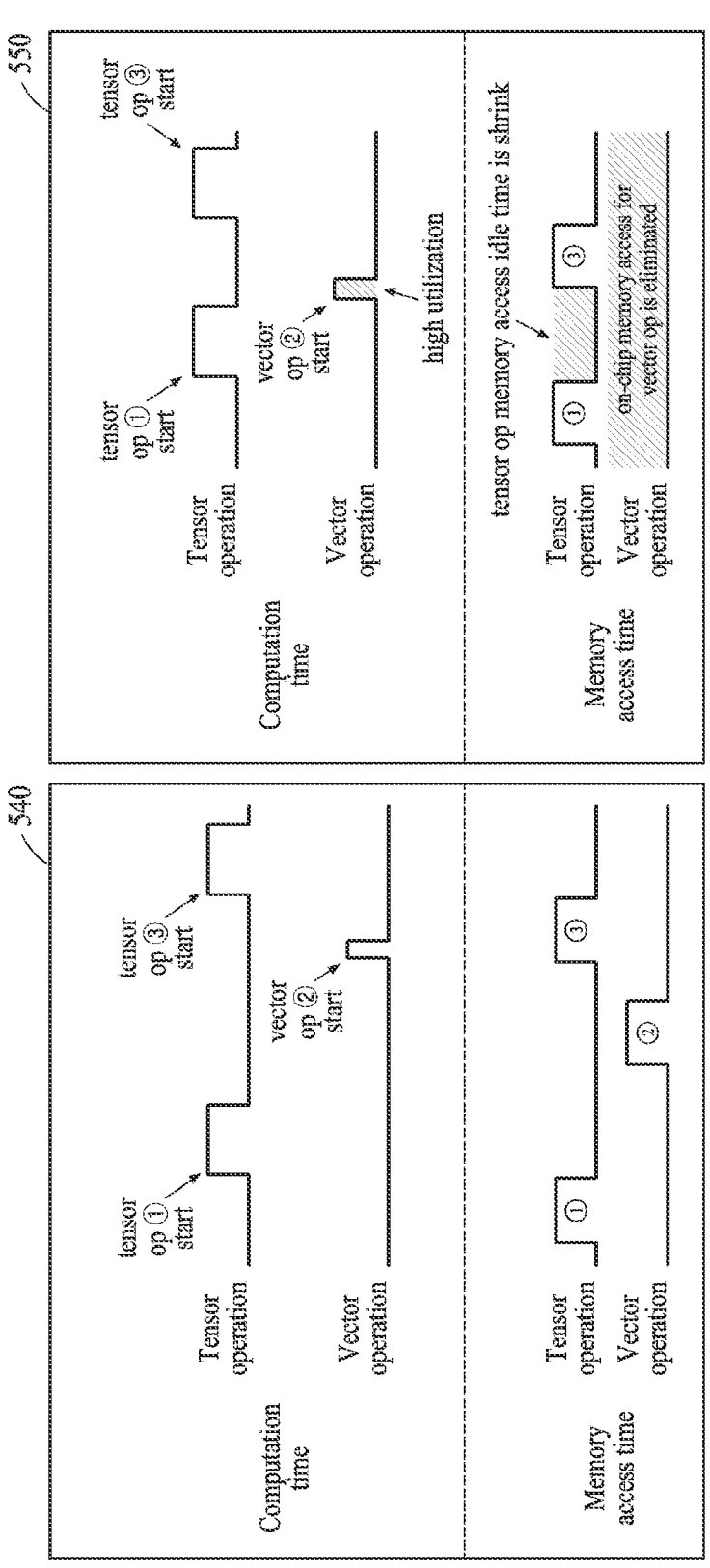

FIGS. 5A and 5B illustrate examples of processing a depth-wise convolution block using a computation apparatus based on the present disclosure.

Referring to FIG. 5A, the depth-wise convolution block may include a convolution operation 510 (for example, a 1×1 convolution operation), a depth-wise convolution operation 520 (for example, a 3×3 depth-wise convolution operation), and a convolution operation 530 (for example, a 1×1 convolution operation). The convolution operations 510 and 530 may be computation-bound tensor operations, and the depth-wise convolution operation 520 may be a memory-bound vector operation.

For example, an output obtained by performing an activation function operation (for example, a rectified linear unit (ReLU) function operation) on a result of the convolution operation 510 may be an input of the depth-wise convolution operation 520. An output obtained by performing an activation function operation (for example, a ReLU function operation) on a result of the depth-wise convolution operation 520 may be an input of the convolution operation 530.

The tensor core 210 of the computation apparatus may perform the convolution operation 510, and the vector core 220 may receive an output of the convolution operation 510 as an input. When the output of the convolution operation 510 is received as an input to the vector core 220, the functional unit 310 of the vector core 220 may perform a first activation function operation on the output of the convolution operation 510.

The ALU 330 of the vector core 220 may receive weight data stored in the weight buffer 320, may receive a result of the first activation function operation from the functional unit 310, and may perform the depth-wise convolution operation 520 between the weight data and the result of the first activation function operation.

The functional unit 310 may receive a result of the depth-wise convolution operation 520 as an input and may perform a second activation function operation, and the vector core 220 may write back a result of the second activation function operation to the on-chip memory 240.

The tensor core 210 may read the result of the second activation function operation and may perform the convolution operation 530.

Referring to FIG. 5B, a left box 540 illustrates a computation time and a memory access time required when only a tensor core is used to process a depth-wise convolution block, and a right box 550 illustrates a computation time and a memory access time required when the computation apparatus including a tensor core and a vector core according to an example is used to process a depth-wise convolution block.

The computation apparatus may perform a vector operation using the vector core 220 optimized to perform the vector operation, and thus it is possible to enhance hardware utilization compared to when only the tensor core is used to perform an operation. For example, the computation apparatus may perform a pooling operation and a non-linear function operation using the functional unit 310 of the vector core 220, and may perform a depth-wise convolution operation using the ALU 330 of the vector core 220.

Also, the computation apparatus may perform a vector operation using an output of a tensor operation as an input of the vector operation, instead of performing the vector operation after writing back the output of the tensor operation to the on-chip memory 240. As a result, the computation apparatus may reduce on-chip memory access energy. Also, the computation apparatus may reduce a memory access idle time of the tensor operation, which may result in a decrease in a total time for performing operations.

Referring to the left box 540, it is inevitable that the computation device using only the tensor core may write back an output of a tensor operation to the on-chip memory 240 and then perform a vector operation. For example, the computation device using only the tensor core may write back the output of the convolution operation 510 to the on-chip memory 240 and then perform the depth-wise convolution operation 520.

Referring to the right box 550, the computation apparatus may perform a vector operation using an output of a tensor operation as an input of the vector operation, without first having to write back the output of the tensor operation to the on-chip memory 240. For example, the computation apparatus may use the output of the convolution operation 510 as the input of the depth-wise convolution operation 520.

Figure 6A:
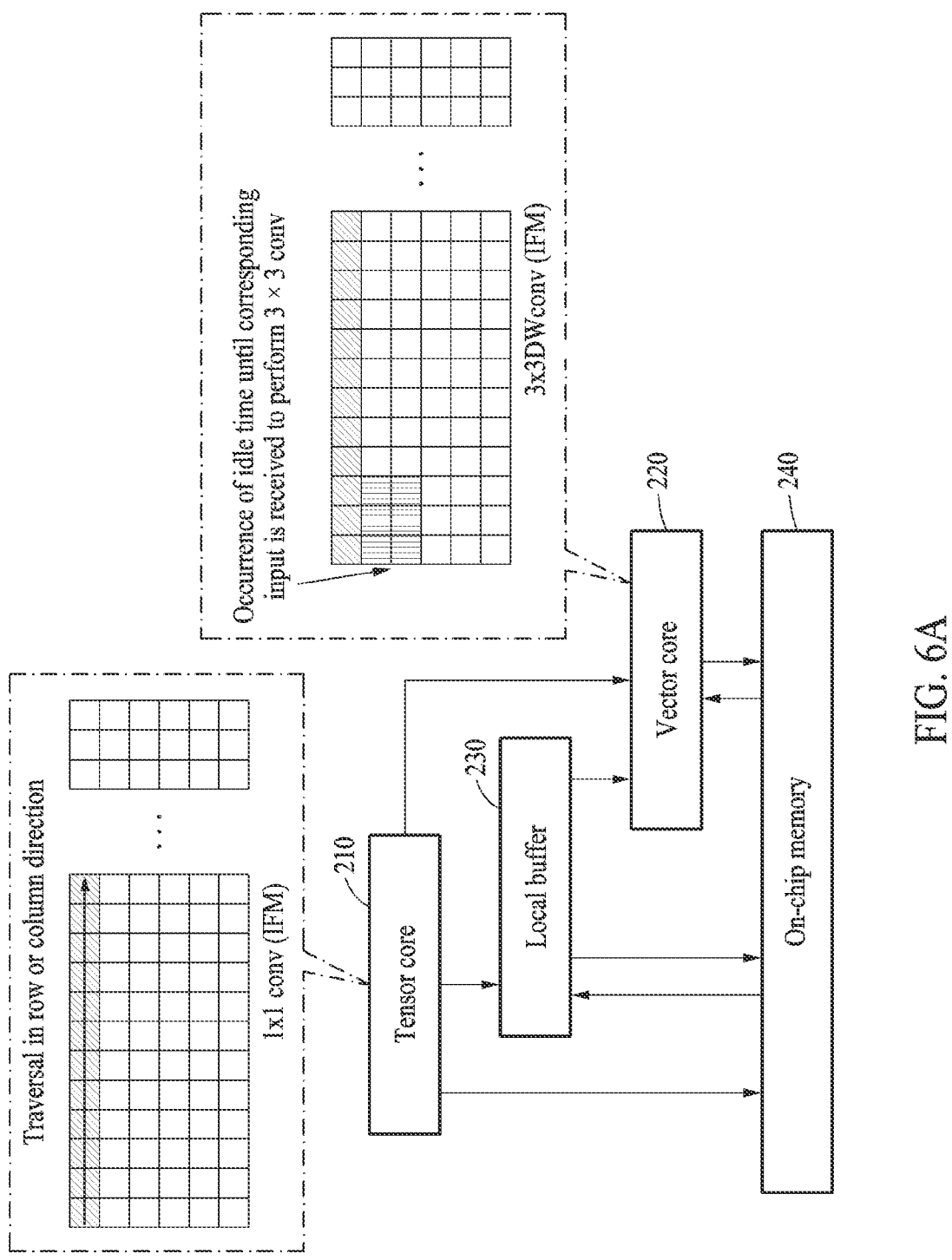
FIGS. 6A and 6B illustrate examples of a method of reducing an idle time of a vector operation.
Figure 6B:
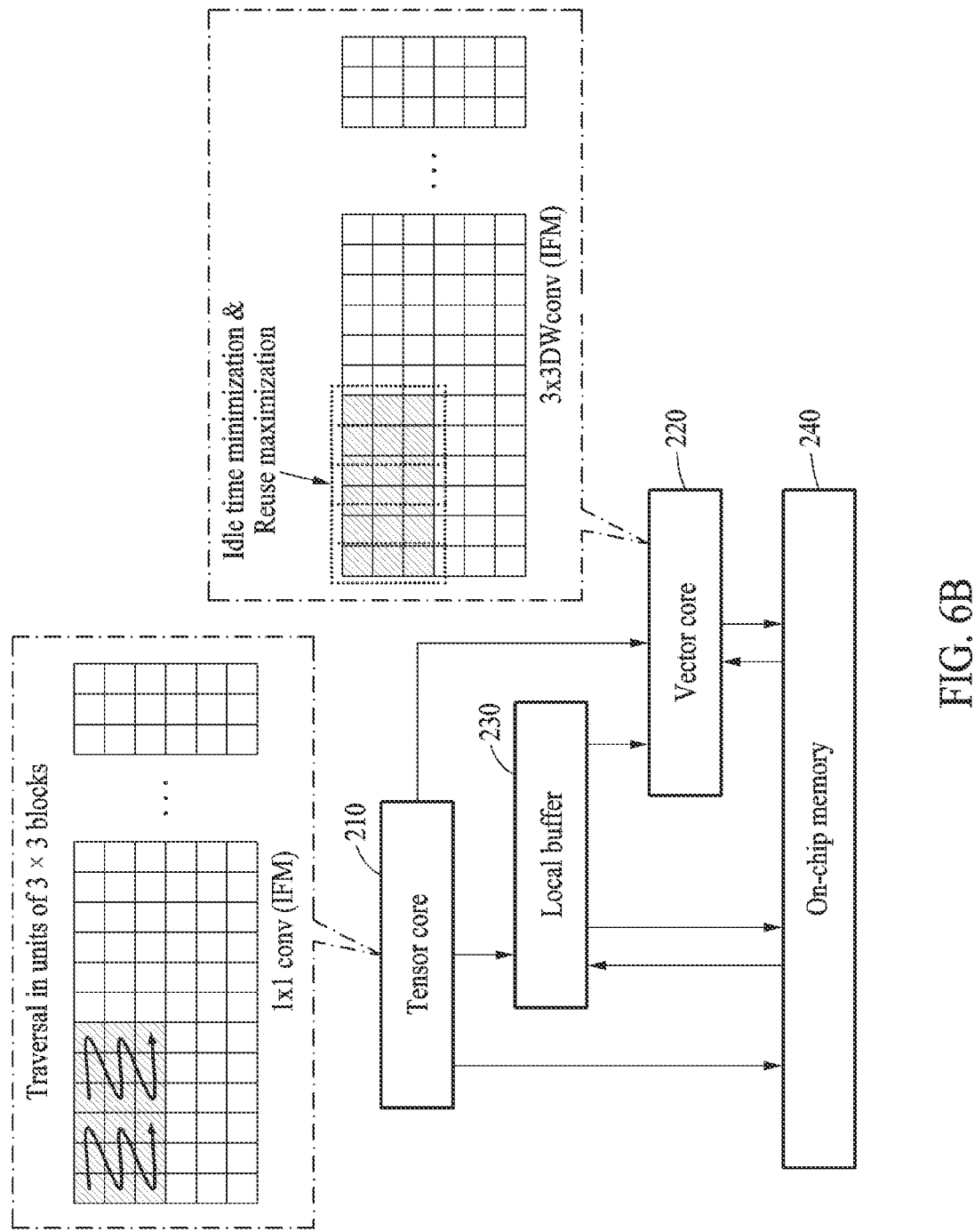

FIGS. 6A and 6B illustrate examples of a method of reducing an idle time of a vector operation based on the present disclosure.

Referring to FIG. 6A, a 1×1 convolution operation and a 3×3 depth-wise convolution operation may be consecutively performed to accelerate a depth-wise convolution block in a vector core. For example, when the 1×1 convolution operation is performed in a direction of a row or a column, an idle time may occur until a 3×3 input feature map is prepared to perform the 3×3 depth-wise convolution operation. In this example, due to a decrease in a data reusability of a local buffer, an access time of an on-chip memory and/or the local buffer may increase for the 3×3 depth-wise convolution operation. Hereinafter, for convenience of description, description is provided based on the 1×1 convolution operation and the 3×3 depth-wise convolution operation, however, examples may also be applicable to blocks of the other sizes.

Referring to FIG. 6B, the tensor core 210 may perform a traversal for a tensor operation in units of blocks for performing a vector operation. For example, when a depth-wise convolution operation is performed in units of 3×3 blocks, the tensor core 210 may traverse in units of 3×3 blocks when performing a 1×1 convolution operation, to minimize an idle time occurring until an input of a 3×3 depth-wise convolution operation is prepared, and to maximize a reusability of an input feature map of the 3×3 depth-wise convolution operation in the local buffer 230. Thus, it is possible to enhance/reduce a total time for performing operations and a power consumption by minimizing an access time of the local buffer 230 and the on-chip memory 240.

Figure 7A:
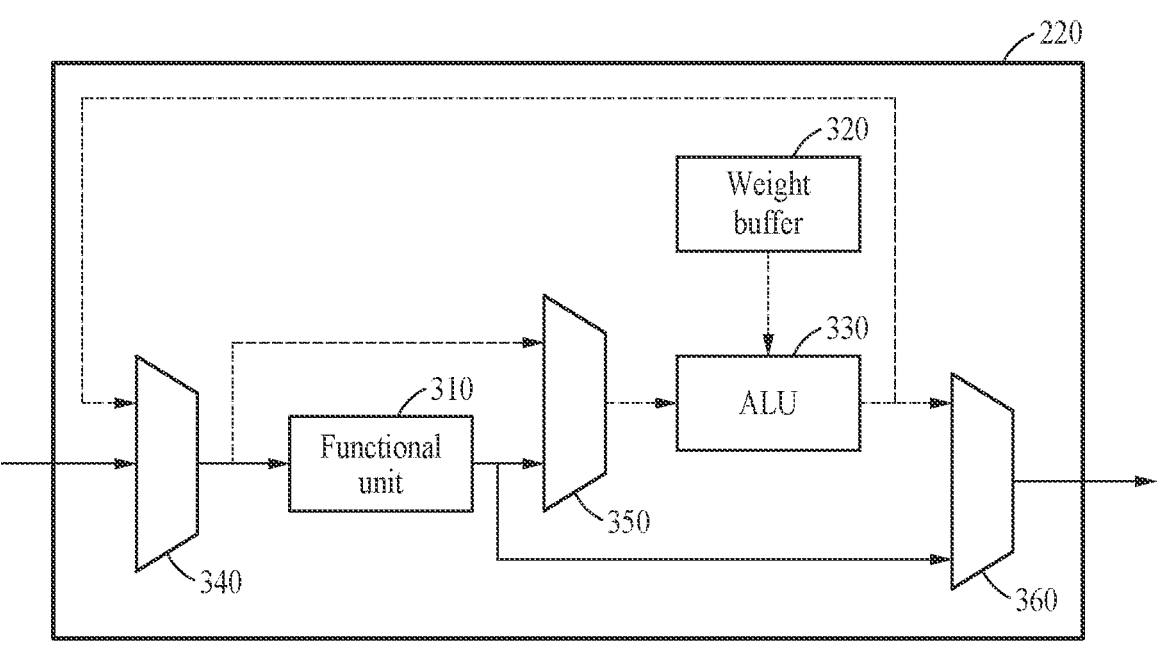
FIGS. 7A and 7B illustrate examples of a method of performing a vector operation.
Figure 7B:
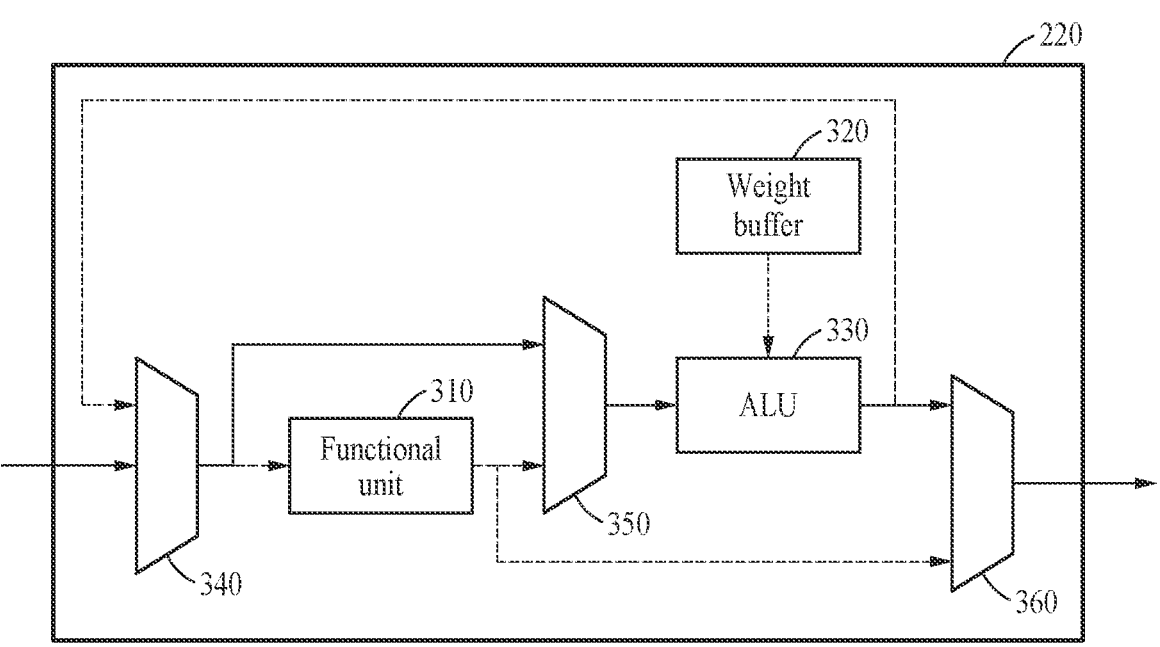

FIGS. 7A and 7B illustrate examples of a method of performing a vector operation based on the present disclosure.

Referring to FIG. 7A, the vector core 220 may perform a vector operation, for example, maximum and/or minimum pooling operation, and/or a non-linear function operation.

The vector core 220 may perform a maximum and/or minimum comparison operation for the maximum and/or minimum pooling operation using the functional unit 310. For example, the vector core 220 may receive input data from the outside, may perform a maximum and/or minimum operation based on a current input and a maximum value and/or minimum value detected in a previous cycle in the functional unit 310, and may store a new maximum and/or minimum value in the second multiplexer 350. When a maximum and/or minimum operation is performed on all elements of a pooling window, the vector core 220 may output a final maximum and/or minimum pooling result.

Also, the functional unit 310 may include a look-up table to efficiently provide a basic non-linear function (for example, ReLU, ReLU6, or PReLU) operation. For example, the vector core 220 may receive input data from the outside, may search for a stored look-up table from the functional unit 310, and may perform a non-linear function operation.

Referring to FIG. 7B, the vector core 220 may perform an average pooling operation, and a non-linear function operation using an interpolation operation and/or a linear approximation operation.

The vector core 220 may perform the average pooling operation using the ALU 330. For example, the vector core 220 may receive input data from the outside and may perform an accumulation operation in the ALU 330 after bypassing the functional unit 310. When the accumulation operation is performed on all elements of the pooling window, the vector core 220 may output a final average pooling result obtained by dividing an accumulation result by a size of the pooling window.

Also, the vector core 220 may perform the non-linear function operation using the interpolation operation and/or the linear approximation operation, through the ALU 330. For example, the vector core 220 may receive input data from the outside and may perform an operation of ACC=ACC+(A×B) in the ALU 330 after bypassing the functional unit 310. When the operation of ACC=ACC+(A× B) is performed on all chunks, the vector core 220 may output a final result.

The apparatuses, units, modules, devices, and other components described herein are implemented by hardware components. For example, the tensor core 210, the vector core 220, the local buffer 230, the on-chip memory 240, the instruction fetching and control unit 250, the functional unit 310, the weight buffer 320, the arithmetic logic unit (ALU) 330, and the multiplexers 340, 350, and 360, may all be implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control one or more processors or computers to implement the hardware components and perform the methods as described above are written as computer programs, code segments, instructions or any combination thereof, for individually or collectively instructing or configuring the one or more processors or computers to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing software, for example, one or more processors or computers to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EE-PROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for performing a deep learning operation, the apparatus comprising:
a tensor core configured to perform a tensor operation, the tensor core being based on an adder tree; and
a vector core configured to perform a vector operation using an output of the tensor core received from the tensor core and weight data as an input, the vector core being based on a multiplier and accumulator (MAC).

2. The apparatus of claim 1, wherein
the tensor operation comprises a matrix-matrix multiplication operation, and
the vector operation comprises any one or any combination of a vector-matrix multiplication operation, a vector-vector multiplication operation, and an element-wise operation.

3. The apparatus of claim 1, wherein the vector core comprises a MAC-based arithmetic logic unit (ALU) configured to perform the vector operation.

4. The apparatus of claim 1, wherein the vector core comprises a functional unit configured to perform one or both of a pooling operation and a non-linear function operation.

5. The apparatus of claim 4, wherein the functional unit comprises a look-up table to perform one or both of the pooling operation and the non-linear function operation.

6. The apparatus of claim 1, wherein the vector core comprises a weight buffer configured to store the weight data.

7. The apparatus of claim 1, further comprising:
a local buffer configured to store data to enable the vector core to reuse the output of the tensor core to perform the vector operation.

8. The apparatus of claim 1, wherein the vector core is configured to perform a first vector operation using an output of a first tensor operation as an input while the tensor core is performing a second tensor operation.

9. The apparatus of claim 1, wherein the vector core comprises:
a functional unit configured to perform one or both of a pooling operation and a non-linear function operation;
a MAC-based arithmetic logic unit (ALU) configured to perform the vector operation;
a weight buffer configured to store the weight data; and
a first multiplexer configured to select at least one of the output of the tensor core and an output of the ALU as an input of the functional unit.

10. The apparatus of claim 9, wherein the vector core comprises a second multiplexer configured to select at least one of an output of the functional unit and an output of the first multiplexer as an input of the ALU.

11. The apparatus of claim 10, wherein the vector core comprises a third multiplexer configured to select at least one of an output of the functional unit and the output of the ALU as an output of the vector core.

12. The apparatus of claim 1, wherein the tensor core is configured to perform a traversal for the tensor operation in units of blocks for performing the vector operation.

13. The apparatus of claim 1, wherein
the tensor core is configured to perform a convolution operation,
the vector core comprises:
a functional unit configured to perform one or both of a pooling operation and a non-linear function operation;
a MAC-based arithmetic logic unit (ALU) configured to perform the vector operation; and
a weight buffer configured to store the weight data,
the functional unit is configured to receive an output of the convolution operation as an input and to perform a first activation function operation,
the ALU is configured to perform a depth-wise convolution operation between the weight data and a result of the first activation function operation, and
the functional unit is configured to receive a result of the depth-wise convolution operation as an input and to perform a second activation function operation.

14. A method of performing a deep learning operation, the method comprising:
performing a tensor operation using a tensor core that is based on an adder tree; and
performing a vector operation using an output of the tensor core received from the tensor core and weight data as an input, by a vector core that is based on a multiplier and accumulator (MAC).

15. The method of claim 14, wherein the tensor operation comprises a matrix-matrix multiplication operation, and the vector operation comprises any one or any combination of a vector-matrix multiplication operation, a vector-vector multiplication operation, and an element-wise operation.

16. The method of claim 14, wherein performing the tensor operation comprises performing a convolution operation, and performing the vector operation comprises:

receiving an output of the convolution operation as an input and performing a first activation function operation;

performing a depth-wise convolution operation between the weight data and a result of the first activation function operation; and receiving a result of the depth-wise convolution operation as an input and performing a second activation function operation.

17. The method of claim 14, wherein performing the tensor operation comprises performing a traversal for the tensor operation in units of blocks for performing the vector operation.

18. A non-transitory computer-readable storage medium storing instructions that, when executed by a processor, cause the processor to perform the method of claim 14.

19. An apparatus comprising:

one or more processors configured to:

perform a first tensor operation and perform a second tensor operation subsequent to the first tensor operation, and perform a vector operation using an output of the first tensor operation and weight data as an input while simultaneously performing the second tensor operation.

20. The apparatus of claim 19, wherein the one or more processors comprise:

an adder tree-based artificial neural network (ANN) accelerator configured to perform the first tensor operation and the second tensor operation; and a multiplier and accumulator (MAC)-based processor configured to perform the vector operation.

21. The apparatus of claim 19, wherein the first tensor operation is a first convolution operation, the second tensor operation is a second convolution operation, and the vector operation is a depth-wise convolution operation.

22. The apparatus of claim 21, wherein the one or more processors are configured to perform an activation function operation on a result of the first convolution operation to generate the output of the first tensor operation.

* * * * *